(12) United States Patent
Basso

(10) Patent No.: US 8,033,503 B2
(45) Date of Patent: Oct. 11, 2011

(54) PRESSURE BULKHEAD FOR AN AEROSPACE FUSELAGE

(75) Inventor: Pasquale Basso, Hamburg (DE)

(73) Assignee: AIRBUS Deutschland GmbH, Hamburg (DE)

(*) Notice: Subject to any disclaimer, the term of this patent is extended or adjusted under 35 U.S.C. 154(b) by 32 days.

(21) Appl. No.: 12/308,831

(22) PCT Filed: Jun. 20, 2007

(86) PCT No.: PCT/EP2007/056137
§ 371 (c)(1),
(2), (4) Date: Dec. 4, 2009

(87) PCT Pub. No.: WO2008/000670
PCT Pub. Date: Jan. 3, 2008

(65) Prior Publication Data
US 2010/0065685 A1     Mar. 18, 2010

Related U.S. Application Data

(60) Provisional application No. 60/816,559, filed on Jun. 26, 2006.

(30) Foreign Application Priority Data

Jun. 26, 2006   (DE) .................. 10 2006 029 231

(51) Int. Cl.
*B64C 1/10* (2006.01)

(52) U.S. Cl. .................. 244/119; 244/121; 52/220.8

(58) Field of Classification Search ............... 52/220.8; 244/121, 119, 129.1, 117 R
See application file for complete search history.

(56) References Cited

U.S. PATENT DOCUMENTS

| 2,669,402 | A | * | 2/1954 | Del Mar ................... 410/118 |
| 3,486,723 | A | * | 12/1969 | Harrison ................... 410/118 |
| 4,073,452 | A | * | 2/1978 | Gosau ..................... 244/118.5 |
| 4,728,059 | A | * | 3/1988 | Stephen et al. ............. 244/119 |
| 5,934,616 | A | * | 8/1999 | Reimers et al. ............. 244/119 |
| 6,378,805 | B1 | * | 4/2002 | Stephan et al. ............. 244/119 |
| 7,766,277 | B2 | * | 8/2010 | Anderson et al. ........... 244/121 |
| 7,874,516 | B2 | * | 1/2011 | Cacciaguerra .............. 244/119 |

FOREIGN PATENT DOCUMENTS

| DE | 1 053 319 |   | 3/1959 |
| DE | 1053319 | * | 3/1959 |
| DE | 25 36 231 | * | 2/1977 |
| DE | 35 34 719 A1 | * | 4/1987 |
| DE | 38 44 080 A1 |   | 7/1990 |
| DE | 3844080 A1 | * | 7/1990 |
| EP | 0 217 117 |   | 8/1986 |
| EP | 0217117 | * | 8/1986 |
| EP | 1 151 917 A2 |   | 11/2001 |
| EP | 1151917 A2 | * | 11/2001 |
| GB | 1 227 910 |   | 4/1971 |
| GB | 1227910 | * | 4/1971 |
| RU | 5785 U1 |   | 1/1998 |
| RU | 2190556 C2 |   | 10/2002 |

* cited by examiner

*Primary Examiner* — Robert Canfield
*Assistant Examiner* — Jody Giacoman
(74) *Attorney, Agent, or Firm* — Maginot Moore & Beck

(57) ABSTRACT

A pressure bulkhead for an aerospace fuselage includes a bulkhead main portion having an approximately flat shape in unloaded state; and a frame supporting and connecting said bulkhead main portion to the fuselage; wherein said bulkhead main portion includes an airtight structure having a reticular component.

12 Claims, 5 Drawing Sheets

PRESSURE BULKHEAD FOR AN AEROSPACE FUSELAGE

FIELD OF THE INVENTION

The present invention relates to a pressure bulkhead for an aerospace fuselage.

BACKGROUND OF THE INVENTION

A pressure bulkhead belongs to the internal structures of an aircraft fuselage and is used for ensuring a pressure tight interior, e.g. in the tail section of said aircraft. The bulkhead consists generally of rigid shells, e.g. with a single or double curvature, made of metal or composite materials, often reinforced by so called stiffeners.

The main disadvantages of the existing solutions of a pressure bulkhead are the following: the weight increment of the structure necessary for the prevention of static instabilities; the difficult manufacturing processes for both the metal and the composite materials solutions; the use of expensive materials and/or processes; and the difficult maintenance of the structures next to the pressure bulkhead.

With regard to the weight increment the main structural problem is the static instability caused by shear and compression forces. These instabilities arise in correspondence of load states as the lateral maneuvers with high twisting moments (high shear stresses), and in correspondence of negative pressure gradients (high compression stresses), such as an eventual rapid loss of altitude of the aircraft. For these reasons, a thickness increase of the shell of a rigid pressure bulkhead is necessary and in order to save weight, the adoption of stiffeners in the radial direction as well as sometimes in the circumferential direction may be mandatory.

Regarding the difficult manufacturing due to the presence of the stiffeners and due to the double curvature of the above mentioned bulkheads, the manufacturing process results in a very complex and expensive task.

In case of use of expensive materials and/or processes, composite materials are often advantageous because of their ability to save weight and to fit a shape having a double curvature, avoiding the high number of rivets needed for a metal solution. Such materials are as well expensive as their manufacturing processes, especially in the case of composite sandwich stiffeners.

With regard to the difficult maintenance, due to the curvature adopted and the related space occupation, it results in a difficult access to the structure in the back of the pressure bulkhead and a difficult cleaning of the areas close to the attachment of the bulkhead to the correspondent frame.

Document EP 0 217 117 A1 describes a pressure bulkhead with a curvature provided with a safety support assembly made of a belt network. The belts are fastened to the bulkhead after having fastened the same.

There is a need to reduce the weight, manufacturing time, manufacturing costs and to provide easier maintenance of a pressure bulkhead.

SUMMARY OF THE INVENTION

In view of the above it is one of the objects of the present invention to provide a pressure bulkhead for an aerospace fuselage which avoids or mitigates the disadvantages mentioned above.

Accordingly, a pressure bulkhead for an aerospace fuselage, may include a bulkhead main portion having an approximately flat shape in an unloaded state; and a frame supporting and connecting said bulkhead main portion to the fuselage; wherein said bulkhead main portion comprises an airtight structure having a reticular component comprising ligament elements which are braided ligaments forming a cloth adapted to be airtight, wherein said cloth comprises one or more layers of standard fabrics stacked in a quasi orthotropic sequence, and wherein said cloth comprises at least one portion of polar weaves forming an opening for an airtight passage of a conduit.

Thus weight of the bulkhead is decreased and maintenance of the structures and the systems in the rear fuselage is facilitated because the pressure bulkhead is flat under unloaded condition. The weight savings may be approximately up to 14 . . . 18%. Furthermore manufacturing time is reduced because of the decreased number of parts and the fact that no stiffeners are necessary any more. Costs are reduced as well due to the fact that the used materials are cheaper than those of the state of the art and because no curing cycles are necessary in comparison with composite materials.

Due to the elasticity of the pressure bulkhead of the present invention there are only tensional stresses under both positive and negative pressure gradients, which results in the particular advantage that no structural instabilities are possible for such pressure bulkheads.

In a first embodiment of the present invention, said reticular component may include ligament elements, in particular braided ligaments forming a cloth.

The first embodiment may be advantageous because said cloth is adapted to be airtight. For that reason the braided ligaments can be made in particular of aromatic polyamide. The braiding of the ligaments can be adapted to be airtight, so that neither infiltration of resin or the like nor curing cycles of said resin are needed, which results in reduced manufacturing time and reduced costs.

In a second embodiment of the present invention, said ligament elements are belt-shaped ligaments extending radially in at least one first layer and one second layer, respectively and form at least two retaining layers for a sealing element arranged between said retaining layers. The sealing element may be a thermoplastic membrane. This structure is flat under its unloaded condition.

According to a further embodiment, inner ends of said belt-shaped ligament elements are connected to at least one central belt and the other ends are connected to at least one peripheral belt, wherein said sealing element is connected to said at least one peripheral belt. Thus, an elastic pressure bulkhead without structural instabilities is achieved. No stiffeners are needed, which results in reduced manufacturing time and reduced costs.

The frame can be made of metallic and/or composite material, such as aluminium, which may be of the type 7150.

BRIEF DESCRIPTION OF THE DRAWINGS

The present invention is explained in more detail below using preferred exemplary embodiments and with reference to the attached figures of the drawings, in which.

In the figures, the same reference numbers refer to identical or functionally identical components unless otherwise stated.

DETAILED DESCRIPTION OF THE INVENTION

Figure 1:
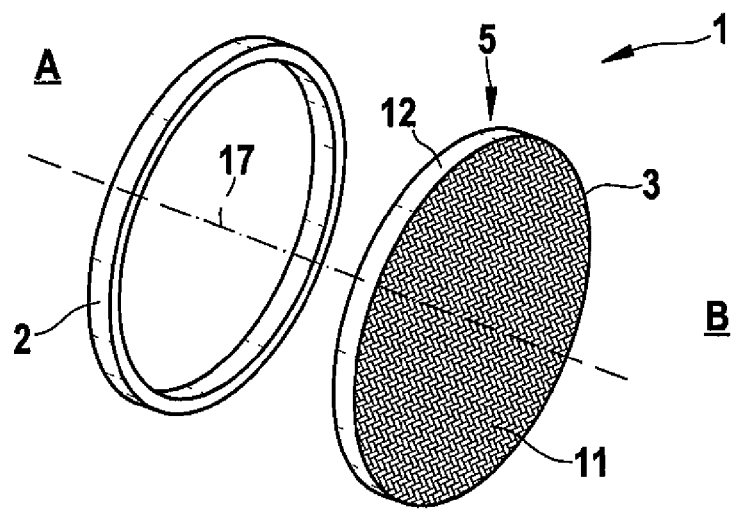
FIG. 1 is a perspective exploded view of a first embodiment of the present invention.

FIG. 1 is a perspective exploded view of a first embodiment of the present invention. It shows a pressure bulkhead 1 having a longitudinal axis 17. In this embodiment the bulkhead 1 has a circular or oval shape and comprises a frame 2 and a bulkhead main portion 3. The bulkhead main portion 3 consists of a reticular component 5, which is formed by a braided cloth 11 with a peripheral rim 12.

On the left side of the frame 2 there is an inside of a not shown interior of an aircraft, indicated by the reference sign A. Reference sign B indicates an outside, e.g. the rear of the tail of the aircraft not shown.

Figure 2A:
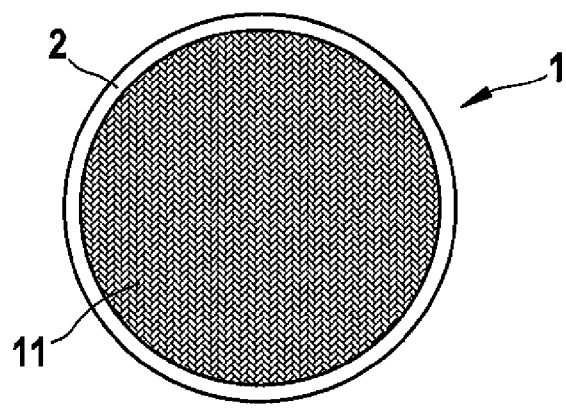
FIG. 2 shows a view of the assembled embodiment according to FIG. 1 from inside (FIG. 2a) and outside (FIG. 2b)
Figure 2B:
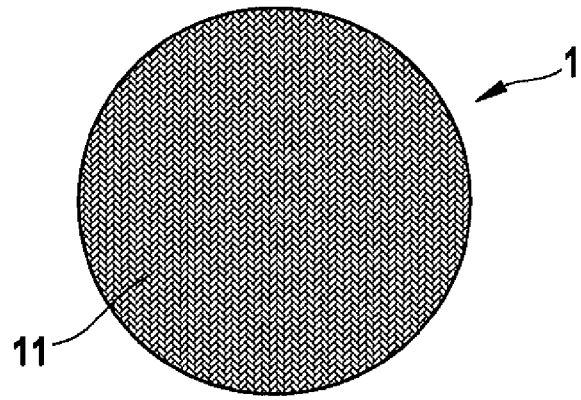
Figure 3:
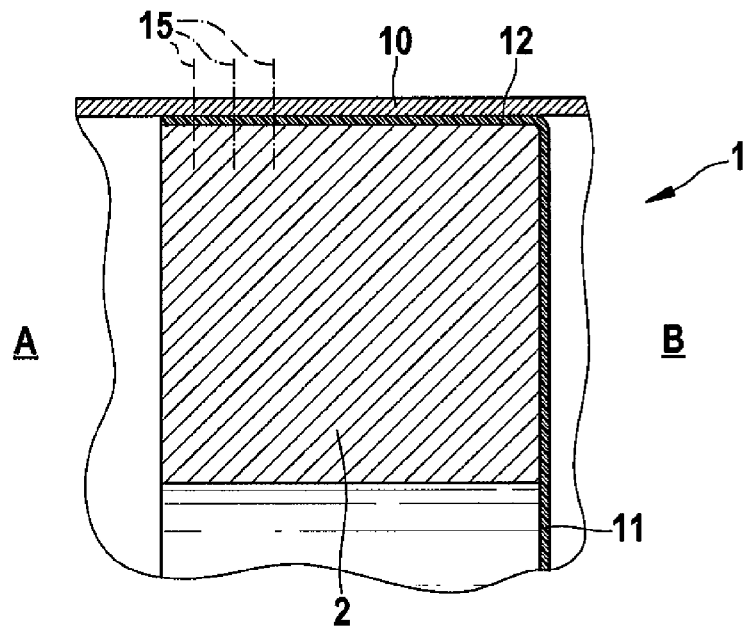
FIG. 3 is an enlarged schematic sectional view of an exemplary attachment of the bulkhead according to the first embodiment of FIG. 1 to a fuselage of an aircraft.

The frame 2 supports the bulkhead main portion 3 which is fixed to the frame 2 as shown in FIG. 2 and in an enlarged sectional view in FIG. 3. FIG. 2 (above) illustrates a plan view of the assembled bulkhead 1 from the inside A and from the outside B (below). As can be seen from FIG. 2, the cloth 11 is attached to the frame 2 from the outside B as illustrated in FIG. 3.

FIG. 3 is an enlarged schematic sectional view of an exemplary attachment of the bulkhead according to the first embodiment of FIG. 1 to a fuselage 10 of the aircraft. In this example the frame 2 has a rectangle or cross-section or may have another cross-section and may be a hollow profile made of aluminium, such as aluminium 7150. The cloth 11 is attached to the frame 2 on its surface facing to the outside B and on the outer peripheral surface facing to the fuselage 10. The frame 2 is fixed to the fuselage 10 by first fixing elements 15, e.g. rivets. For example, these rivets 15 may fix the attached cloth 11 as well. Further and/or other methods for fixing the cloth 11 may be used, e.g. a suitable adhesive or the same.

As can be seen from FIG. 3, the pressure bulkhead 1 is a flat element under unloaded condition. This is a significant advantage because the areas next to the bulkhead 1 are easy to access and to maintain.

Figure 4:
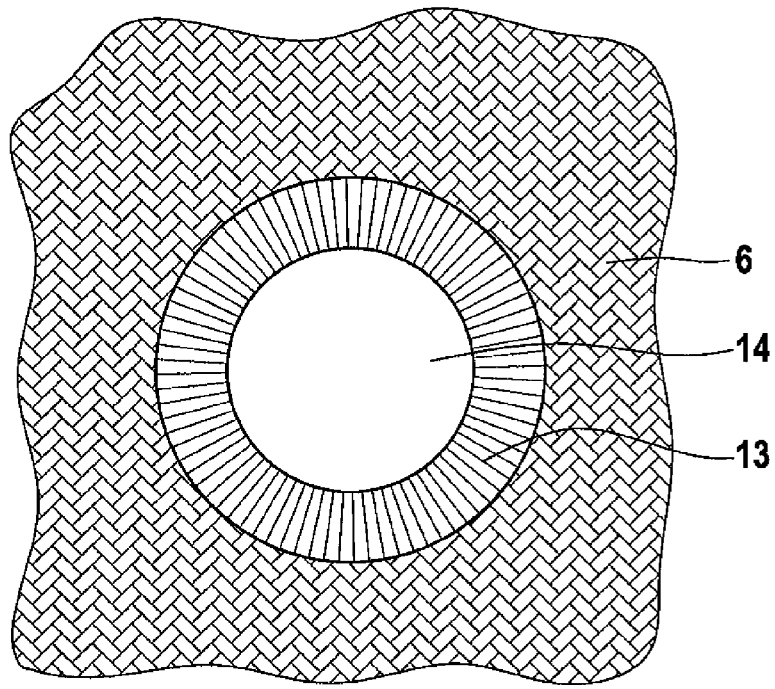
FIG. 4 is an enlarged view of a cloth with an opening.

The cloth 11 may be made of braided ligament elements 6 as can be seen from FIG. 4 in an enlarged view. The ligaments 6 are woven in a specific manner so that an airtight structure is achieved. Thus, the cloth 11 will bear only tensional stresses under loaded condition, for example when the inside A (see FIG. 3) is under cabin pressure. In case of positive or negative pressure gradients, only tensional stresses will occur in the cloth 11.

Furthermore, FIG. 4 shows an opening 14 with so called polar weaves 13 in the cloth 11. This type of opening may be used for airtight passage of e.g. conduits if necessary. The best position of such an arrangement can be found by finite elements analysis of the bulkhead.

Figure 5:
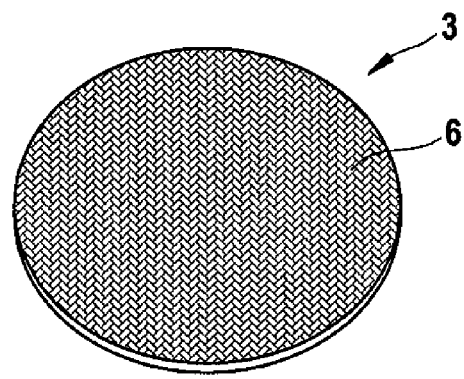
FIG. 5 illustrates a standard cloth.

FIG. 5 illustrates a standard cloth 11 with a circular shape. In an alternative embodiment the cloth 11 may comprise more than one layer of braided ligaments 6. These layers may be standard fabrics stacked in a quasi orthotropic sequence. Due to the airtight structure no resins or the like are necessary. Therefore, the number of parts and time of manufacturing are significantly reduced.

The cloth 11 may be made of aromatic polyamide fibres also known as aramide fibres. This material provides an excellent flame resistance and is a non toxic material. It has a functionality to ensure air tightness even if penetrated by a small particle (e.g. shot bullet).

The examples shown in FIGS. 1 to 5 are of a diameter of approximately 4 m.

Figure 6:
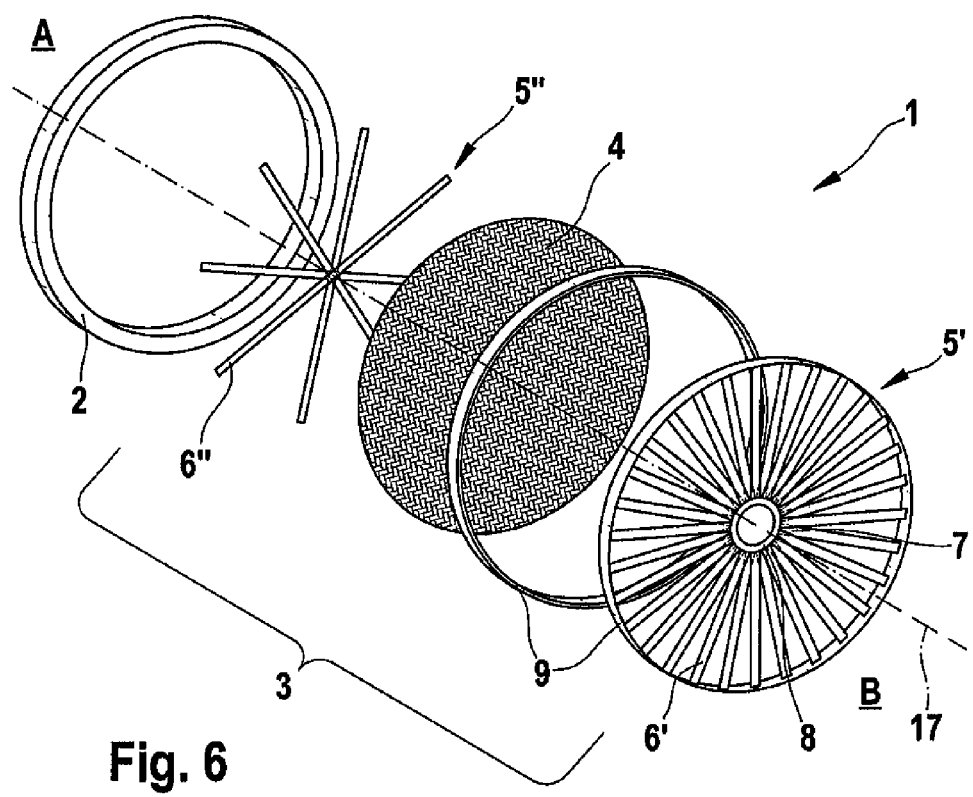
FIG. 6 is a perspective exploded view of a second embodiment of the present invention.

FIG. 6 is a perspective exploded view of a second embodiment of the present invention.

It illustrates a pressure bulkhead 1' having a longitudinal axis 17. In this example, the bulkhead 1 has a circular or oval shape and comprises a frame 2 and a bulkhead main portion 3. The bulkhead main portion 3 consists of two reticular components 5' and 5", which are formed by ligament elements 6', 6" in the shape of belts.

On the left side of the frame 2 there is the inside, indicated by the reference sign A of a not shown interior of an aircraft. Reference sign B indicates the outside, e.g. the rear part of the tail of the aircraft not shown.

Figure 9:
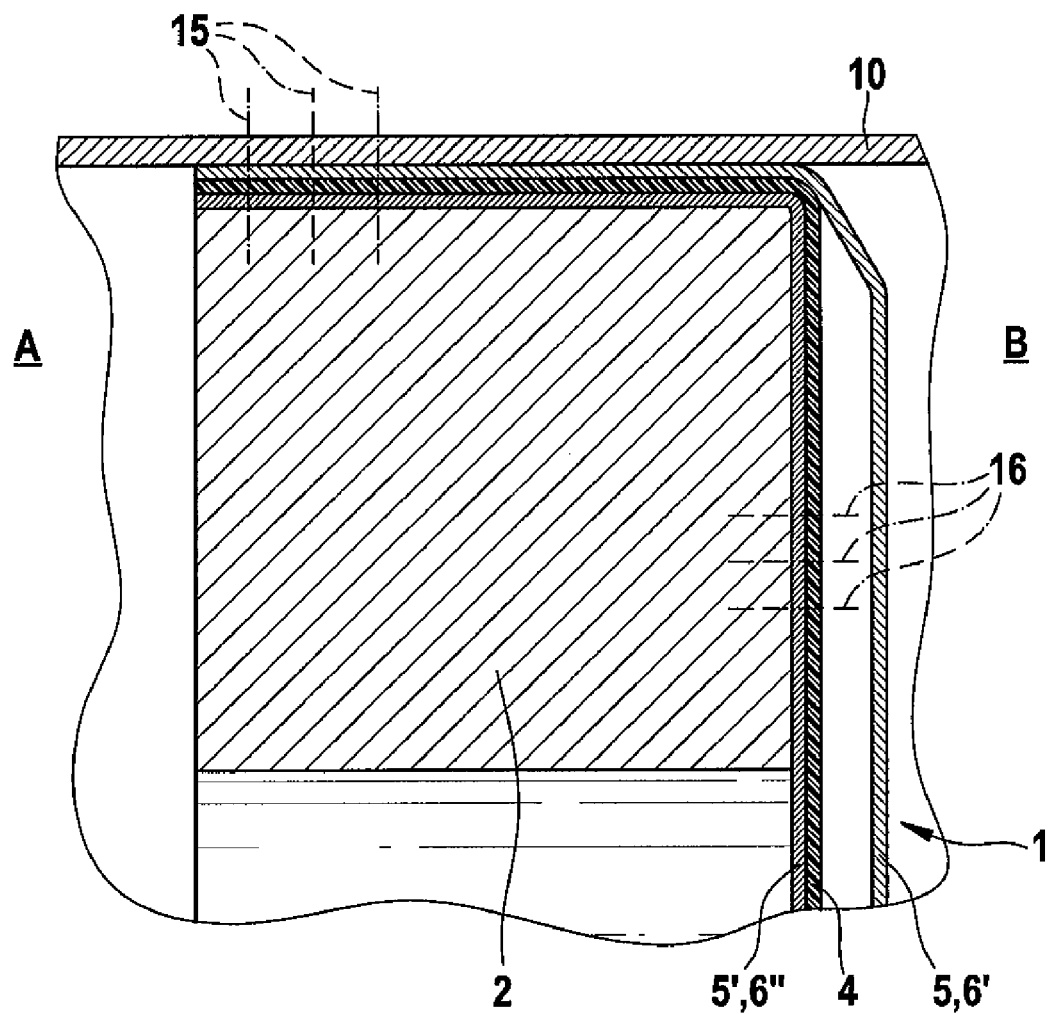
FIG. 9 is an enlarged schematic sectional view of an exemplary attachment of the bulkhead according to the second embodiment of FIG. 6 to a fuselage of an aircraft.

The frame 2 supports the bulkhead main portion 3 which is fixed to the frame 2 as shown in FIG. 9 similar as shown in FIG. 3.

The ligaments 6' of the reticular component 5' are arranged in a manner so that they extend radially in at least one first layer and one second layer, respectively and form at least two retaining layers for a sealing element 4 arranged between said retaining layers.

Figure 7A:
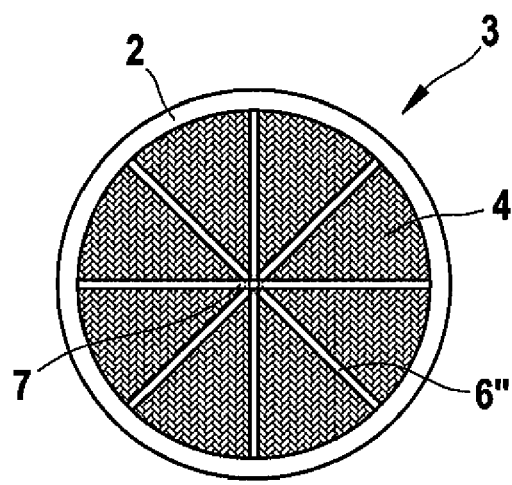
FIG. 7 shows the front (FIG. 7a) and rear view (FIG. 7b) of the assembled embodiment according to FIG. 6.
Figure 7B:
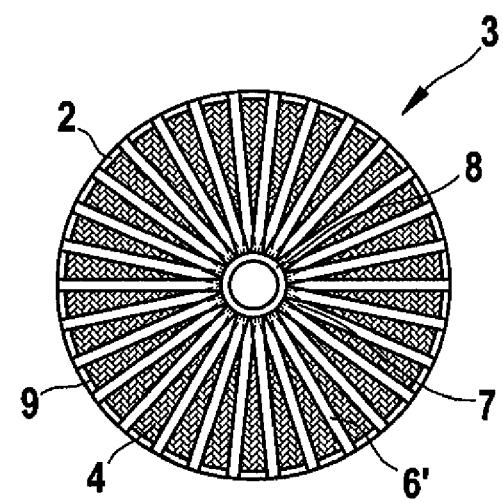

The ligaments 6' of the first retaining layer on the outside B are connected with inner ends 7 to a circular central belt 8 as can be seen from the right view of FIG. 7. The outer ends of the ligaments 6' are connected to a peripheral belt 9. These connections may be formed by sewing or the same.

Figure 8:
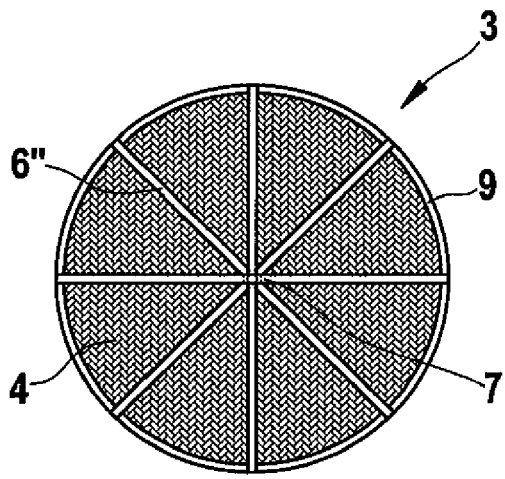
FIG. 8 is a view of a bulkhead main portion of the second embodiment according to FIG. 6.

As shown in FIG. 8, the ligaments 6" of the second retaining layer on the inside A may be smaller than the ligaments 6' of the first layer due to the possible load they have to bear. These ligaments 6" are connected together in a central region and are connected with their outer ends to the peripheral belt 9 as well as the sealing element 4.

According to this embodiment the sealing element 4 is made of a thermoplastic membrane which is flat under unloaded condition and retained by the ligaments 6', 6" of the retaining layers in case of loaded condition. The ligaments 6', 6" are loaded only by tensional stresses in both cases, positive and negative pressure gradients.

The peripheral belt 9 and the ligaments 6', 6" and the sealing element 4 connected thereto is fixed to the fuselage 10 via the frame 2 for example as shown in FIG. 9. As can be seen from FIG. 9, the sealing element 4 and the ligaments 6', 6" are fixed to the frame 2 by second fixing element 16, e.g. rivets. Further and/or other fixing methods may be used.

In the second embodiment of the present invention 250 ligaments 6' and 4 ligaments 6" are used for example. They form a flat bulkhead.

Regarding the sizing of the shown examples it has to be noted as follows: The dimension of each part has been obtained for a circular fuselage having a diameter of about 4 m. An analytical model of the ligaments 6, 6', 6" based on the catenary's equation has been used to evaluate the stability of the bulkhead. The load case taken into account is the maximum positive pressure gradient at ultimate level ($2\Delta P=1.234$ bar) that results the most critical one. All the results obtained, in terms of stress and strain, are compatible with the mechanical properties of the materials selected, while the resulting high frequencies of the first two modes of the frame ensure its stability at ultimate level.

The results of this test show a maximum displacement of the bulkhead main portion 3 of the first embodiment of about 196 mm and of the second embodiment of about 453 mm.

The present invention eliminates the disadvantages of the state of art mentioned above as follows. The pressure bulkhead 1, 1' is a flat element and has a less area with respect to a bulkhead with a single or double curvature. The pressure bulkhead 1, 1' has a reduced thickness and does not need any stiffeners. It cannot buckle because it is a membrane that exhibits only tensional stresses. For these reasons the weight is reduced and the manufacturing problems are reduced.

Furthermore, the pressure bulkhead 1, 1' does not need expensive curing cycles, so the manufacturing time is reduced. Less material is needed with respect to the state of the art. The advantages are reduced thickness, no stiffeners, cost reduction and reduction of manufacturing time.

It will be apparent that modifications can be made to the embodiments described above.

For example, the cloth 11 may be soaked with an appropriate material to achieve a specific high level of air tightness.

The pressure bulkhead 1, 1' may have an other shape than circular or oval shape.

The ligaments 6, 6', 6" may be made of materials with same or better characteristics than the mentioned ones.

What is claimed is:

1. A pressure bulkhead for an aerospace fuselage, comprising:
   a bulkhead main portion having an approximately flat shape in an unloaded state; and
   a frame supporting and connecting said bulkhead main portion to the fuselage;
   wherein said bulkhead main portion comprises an airtight structure having a reticular component comprising ligament elements which are braided ligaments forming a cloth adapted to be airtight, wherein said cloth comprises one or more layers of standard fabrics stacked in a quasi orthotropic sequence, and
   wherein said cloth comprises at least one portion of polar weaves forming an opening for an airtight passage of a conduit.

2. The pressure bulkhead according to claim 1,
   wherein said frame is made of metallic and/or composite material.
3. The pressure bulkhead according to claim 2,
   wherein said frame is made of aluminium 7150.
4. The pressure bulkhead according to claim 1,
   wherein said ligament elements are made of aromatic polyamide fibres.
5. A pressure bulkhead for an aerospace fuselage, comprising:
   a bulkhead main portion having an approximately flat shape in an unloaded state; and
   a frame supporting and connecting said bulkhead main portion to the fuselage;
   wherein said bulkhead main portion comprises an airtight structure having a reticular component comprising ligament elements, and
   wherein said ligament elements are belt-shaped ligaments extending radially in at least one first layer and one second layer, respectively and form at least two retaining layers for a sealing element arranged between said retaining layers.
6. The pressure bulkhead according to claim 5,
   wherein said sealing element is a thermoplastic membrane.
7. The pressure bulkhead according to claim 5,
   wherein inner ends of said belt-shaped ligament elements are connected to at least one central belt and the other ends are connected to at least one peripheral belt.
8. The pressure bulkhead according to claim 7,
   wherein said sealing element is connected to said at least one peripheral belt.
9. The pressure bulkhead according to claim 7,
   wherein said at least one peripheral belt is attached to said frame fixing said sealing element and said airtight structure having a reticular component to said frame.
10. The pressure bulkhead according to claim 5,
    wherein said frame is made of metallic and/or composite material.
11. The pressure bulkhead according to claim 10,
    wherein said frame is made of aluminium 7150.
12. The pressure bulkhead according to claim 5,
    wherein said ligament elements are made of aromatic polyamide fibres.

* * * * *